United States Patent [19]

Nishimura

[11] Patent Number: 5,587,974
[45] Date of Patent: Dec. 24, 1996

[54] MAGNETO-OPTICAL RECORDING MEDIUM HAVING TWO MAGNETIC LAYERS WITH PERPENDICULAR MAGNETIC ANISOTROPY, AND INFORMATION RECORDING METHOD HAVING THE SAME

[75] Inventor: Naoki Nishimura, Tokyo, Japan

[73] Assignee: Canon Kabushiki Kaisha, Tokyo, Japan

[21] Appl. No.: 518,220

[22] Filed: Aug. 23, 1995

Related U.S. Application Data

[63] Continuation of Ser. No. 171,628, Dec. 22, 1993, abandoned.

[30] Foreign Application Priority Data

Dec. 28, 1992 [JP] Japan .................................. 4-347871

[51] Int. Cl.$^6$ .............................. G11B 5/02; G11B 11/00
[52] U.S. Cl. ................................................ 369/13; 360/59
[58] Field of Search ............................. 369/13, 14, 288, 369/275.4, 110; 360/59, 114; 365/122, 10, 27; 428/694 ML, 694 SC, 694 MM, 694 EC

[56] References Cited

U.S. PATENT DOCUMENTS

| | | | |
|---|---|---|---|
| 5,168,482 | 12/1992 | Aratani et al. | 369/13 |
| 5,239,524 | 3/1993 | Sato et al. | 369/13 |
| 5,450,382 | 9/1995 | Shiratori | 369/13 |

*Primary Examiner*—Ali Neyzari
*Attorney, Agent, or Firm*—Fitzpatrick, Cella, Harper & Scinto

[57] ABSTRACT

A magneto-optical recording medium and an information recording method using the medium in which over-write is performed by magnetic field modulation. The magneto-optical recording medium includes a second magnetic layer (initializing layer) consisting of a magnetic layer, which is magnetized in advance in one direction, has a high Curie temperature, does not lose magnetization in a recording/erasing mode, and has a perpendicular magnetic anisotropy, and a first magnetic layer (recording layer) having a perpendicular magnetic anisotropy and exchange-coupled to the second magnetic layer. The data transfer speed in an over-write operation is remarkably increased when recording is performed by turning on/off an external magnetic field in accordance with information while radiating a lazer beam using the magnetooptical recording medium.

4 Claims, 5 Drawing Sheets

"0" RECORDING
CONDITION

"1" RECORDING
CONDITION

"0" RECORDING CONDITION

"1" RECORDING CONDITION

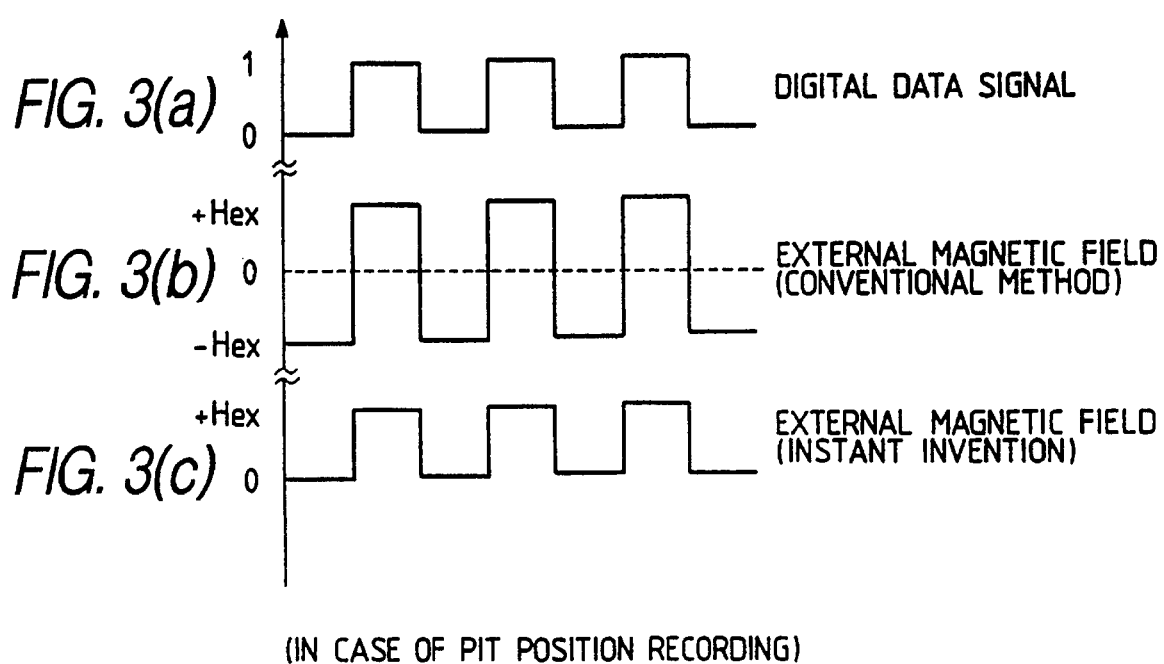

CONVENTIONAL METHOD

INSTANT INVENTION

1: INSTANT INVENTION (MEDIUM IN FIG.5A)
2: INSTANT INVENTION (MEDIUM IN FIG.5B)
3: CONVENTIONAL METHOD

MAGNETO-OPTICAL RECORDING MEDIUM HAVING TWO MAGNETIC LAYERS WITH PERPENDICULAR MAGNETIC ANISOTROPY, AND INFORMATION RECORDING METHOD HAVING THE SAME

This application is a continuation of application Ser. No. 08/171,628, filed Dec. 22, 1993, now abandoned.

BACKGROUND OF THE INVENTION

1. Field of the Invention

The instant invention relates to a magneto-optical recording medium and an information recording method using the same, with which information is recorded by forming a bit of a reversed magnetic domain using a laser beam and an external magnetic field, and information is read out by utilizing a magneto-optical effect obtained upon radiating a polarized laser beam and, more particularly, to a magneto-optical recording medium and an information recording method using the same, which perform an over-write operation by a magnetic field modulation method.

2. Related Background Art

Conventionally, as a rewritable high-density recording method, a magneto-optical recording method has received a lot of attention. With this method, information is recorded by writing a magnetic domain in a magnetic thin film, and the recorded information is read out by utilizing a magneto-optical effect.

Since the magneto-optical recording method uses a magnetic member on a disk as a recording medium, it has features that the recording medium is exchangeable, and information is rewritable.

Such a conventional magneto-optical recording method requires three recording processes (to erase old data, to record new data, and to check whether or not new data is properly recorded). For this reason, in order to rewrite information, a disk must be rotated three times, and hence, the time required for rewriting information corresponds to three revolutions of the disk.

In recent years, over-write methods (an optical modulation method and a magnetic field modulation method) with which new data is directly recorded on old data without executing the erasing process of the three recording processes have been proposed and extensively examined. Of these methods, the optical modulation method performs recording by forming a bit using a modulated laser beam. However, in consideration of the Gaussian distribution of the laser beam intensity and the temperature distribution of a magneto-optical recording medium, the allowable range of laser power for forming a magnetic domain with a small diameter is very narrow with respect to a given beam size. Furthermore, when the magnetic domain interval (bit interval) is decreased to increase the density, a temperature rise of a medium caused by the laser beam which was radiated immediately before a current recording operation adversely affects the current recording. More specifically, when a random pattern is recorded, the optimal value of laser power undesirably changes depending on the pattern.

In contrast to this, since the magnetic field modulation method does not easily pose the above-mentioned problems caused by the temperature distribution although it requires a rather complicated apparatus arrangement, it has been considered promising for practical applications, and has been developed extensively.

When an over-write operation is performed by the conventional magnetic field modulation method, a high-frequency magnet must be generally used as an external magnetic field application means to reverse a magnetic field upward or downward in a direction perpendicular to the film surface in correspondence with a digital data signal "1" or "0".

In this case, when the reversing speed of the magnetic field is increased, the magnetic field that can be applied tends to decrease, and therefore the data transfer speed is limited. Also, since the magnetic field decreases, the magnetic head must be arranged sufficiently close to a medium, and the medium or the head may be damaged due to a contact between them.

SUMMARY OF THE INVENTION

The instant invention has been made in consideration of the above-mentioned problems, and has as its object to provide a magneto-optical recording medium and an information recording method using the same, which can realize a high data transfer speed as compared to the conventional method by improving the conventional magnetic field modulation method and the magneto-optical recording medium.

As a result of the extensive studies in consideration of the above-mentioned problems, we found that the data transfer speed in an over-write operation can be remarkably increased when recording is performed by turning on/off an external magnetic field in accordance with information while radiating a laser beam using a magneto-optical recording medium, which comprises a second magnetic layer (to be referred to as an initializing layer hereinafter) consisting of a magnetic layer, which is magnetized in advance in one direction, has a high Curie temperature, does not lose magnetization in a recording/erasing mode, and has a perpendicular magnetic anisotropy, and a first magnetic layer (to be referred to as a recording layer hereinafter) having a perpendicular magnetic anisotropy and exchange-coupled to the second magnetic layer, thus achieving the instant invention.

BRIEF DESCRIPTION OF THE DRAWINGS

FIG. 3(a)–(c) are charts showing a recording signal and a corresponding change in polarity of an external magnetic field;

DETAILED DESCRIPTION OF THE PREFERRED EMBODIMENTS

A magneto-optical recording medium and an information recording method for recording onto the medium will be described in detail hereinafter with reference to the accompanying drawings.

Structure of Recording Medium

Figure 1:
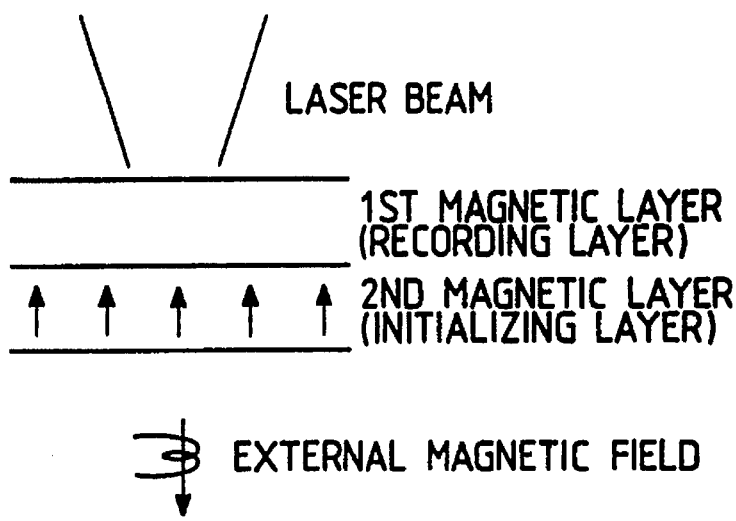
FIG. 1 is a view showing an example of the structure of a magneto-optical recording medium according to the instant invention.

A magneto-optical recording medium used in the instant invention comprises at least two magnetic layers, i.e., an initializing layer and a recording layer, as shown in FIG. 1. To this structure, a reproducing layer having a large Kerr rotation angle, an intermediate layer for controlling interface magnetic wall energy, another magnetic layer for improving, e.g., magnetic field sensitivity, a dielectric layer or a metal layer for attaining an interference effect, protecting the magnetic layers, or improving thermal characteristics, and the like, may be further provided.

Materials of Magnetic Layer

The materials of the initializing layer preferably include rare earth-iron group amorphous alloys, e.g., TbCo, GdTbFeCo, TbFeCo, DyFeCo, GdTbCo, DyFeCo, TbDyFeCo, and the like.

The materials of the recording layer preferably include rare earth-iron group amorphous alloys, e.g., TbFeCo, DyFeCo, TbDyFeCo, and the like.

When a reproduction layer having a large Kerr rotation angle is formed on the light incident side of the recording layer, the materials of the reproduction layer preferably include rare earth-iron group amorphous alloys, e.g., GdCo, GdFeCo, TbFeCo, DyFeCo, GdTbFeCo, GdDyFeCo, TbDyFeCo, NdFeCo, NdGdFeCo, NdTbFeCo, NdDyFeCo, and the like, platinum group-iron group periodic structure films, e.g., Pt/Co, Pd/Co, and the like, or platinum group-iron group alloys, e.g., PtCo, PdCo, and the like.

When an intermediate layer for adjusting interface magnetic wall energy between the recording layer and the initializing layer is formed between these two layers, the materials of the intermediate layer preferably include rare earth-iron group alloys such as GdCo, GdFeCo, TbFeCo, DyFeCo, GdTbFeCo, GdDyFeCo, TbDyFeCo, and the like, or dielectrics such as SiN.

Note that elements such as Cr, Al, Ti, Pt, Nb, and the like may be added to magnetic layers such as the initializing layer, recording layer, intermediate layer, reproducing layer, and the like so as to improve an anti-corrosion resistance.

Characteristic Conditions of Each Layer in Medium

The initializing layer requires at least the following conditions. That is, the initializing layer must be magnetized in one direction by a large external magnetic field during or after the manufacture of a medium, and the direction of magnetization of the initializing layer must remain the same in recording, reproduction, and preservation modes later.

When a laser beam and an external magnetic field are applied to the recording layer, the direction of magnetization of the recording layer follows the same direction as that of the external magnetic field; when only the laser beam is applied, and no external magnetic field is applied, the direction of magnetization of the recording layer follows a stable direction with respect to the direction of magnetization of the initializing layer upon reception of an exchange interaction from the initializing layer. In a preservation state of the medium (at room temperature), even when a magnetic wall is generated between the recording layer and the initializing layer, at least the state of the recording layer must be stably maintained.

These conditions for the recording layer for achieving recording will be exemplified with reference to a case wherein the magnetic layers comprise rare earth-iron group alloys.

When the recording layer and the initializing layer are ferrimagnetic layers, if the dominant magnetization of both the recording and initializing layers is a rare earth element or an iron group element, the medium will be referred to as a P-type medium hereinafter; if the dominant magnetization of the recording layer is a rare earth element, and the dominant magnetization of the initializing layer is an iron group element, or vice versa, the medium will be referred to as an A-type medium hereinafter. [Magnetization States (arrows represent the sum total of sublattice magnetizations)]

① When P-type structure is used:

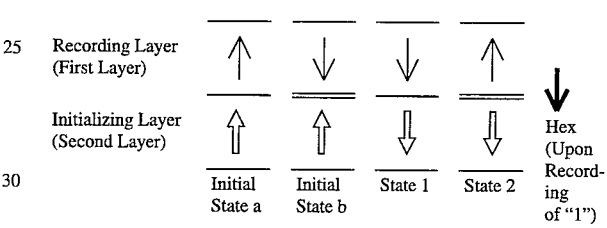

② When A-type Structure is used:
(the initial state a corresponds to, e.g., a "0" recording condition, and the initial state b corresponds to a "1" recording condition. Note that states 1 and 2 are unallowable states.)

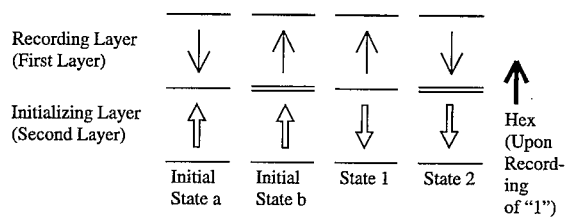

Description of Symbols

Saturation magnetization of recording layer (first layer); $Ms_1$

Coercive force of recording layer (first layer); $Hc_1$

Saturation magnetization of initializing layer (second layer); $Ms_2$

Coercive force of initializing layer (second layer); $Hc_2$

Film thickness of recording layer (first layer); $h_1$

Curie temperature of recording layer (first layer); $Tc_1$

Film thickness of initializing layer (second layer); $h_2$

Curie temperature of initializing layer (second layer); $Tc_2$

External magnetic field; Hex

Interface magnetic wall energy between recording layer and initializing layer; $\sigma_w$ 1. Conditions for Curie temperature and coercive force Since magnetization in the initializing layer must be stably present in all of normal-temperature, reproduction, and recording states, and the magnetization of the recording layer must disappear or the coercive force must decrease and the direction of magnetization of the recording layer must be reversed in the recording state, if the Curie temperatures of the recording and initializing layers are respectively represented by $Tc_1$ and $Tc_2$, and their coercive forces are respectively represented by $Hc_1$ and $Hc_2$, the following relations must be satisfied:

$$Tc_1 < Tc_2 \quad (1)$$

$$Hc_1 < Hc_2 \quad (2)$$

2. Type 1 recording condition (when external magnetic field Hex is applied)

(1) Initial state a → initial state b, initial state b → initial state b

A condition to cause the direction of magnetization of the recording layer to follow the direction of the external magnetic field upon radiation of a laser beam (light radiated in the recording state) is:

$$Hex > Hc_1 + \frac{\sigma_w}{2Ms_1h_1} \text{ (laser radiated state)} \quad (3)$$

A condition to cause the direction of magnetization of the recording layer not to follow the direction of the external magnetic field (initial state a→×initial state b) is:

$$Hex < Hc_1 + \frac{\sigma_w}{2Ms_1h_1} \text{ (laser non-radiated state)} \quad (4)$$

(2) Initial state a→×state 1 A condition to prevent the initial state a from becoming state 1 in both the laser radiated state and the laser non-radiated state is:

$$Hex < \frac{2Ms_1h_1Hc_1 + 2Ms_2h_2Hc_2}{2Ms_1h_1 + 2Ms_2h_2} \quad (5)$$

(3) Initial state b→×state 1 A condition to prevent the initial state b from becoming state 1 in both the laser radiated state and the laser non-radiated state is:

$$Hex < Hc_2 - \frac{\sigma_w}{2Ms_2h_2} \quad (6)$$

3. Type 2 Recording Condition (when no external magnetic field is applied)

(1) Initial state b→initial state a, initial state a →initial state a

A condition to align the direction of magnetization of the recording layer in a direction stable with respect to the direction of magnetization of the initializing layer in the laser radiated state is:

$$Hc_1 < \frac{\sigma_w}{2Ms_1h_1} \text{ (laser radiated state)} \quad (7)$$

A condition not to align the direction of magnetization of the recording layer in a direction stable with respect to the direction of magnetization of the initializing layer in the laser non-radiated state (initial state b→×initial state a) is:

$$Hc_1 > \frac{\sigma_w}{2Ms_1h_1} \text{ (laser non-radiated state)} \quad (8)$$

(2) Initial state b→×state 1 A condition to prevent the initial state b from becoming state 1 in both the laser radiated state and the laser non-radiated state is:

$$Hc_2 > \frac{\sigma_w}{2Ms_2h_2} \text{ (laser non-radiated state)} \quad (9)$$

Recording Method

When the type 1 recording (recording of one of two values) is performed on a medium which satisfies the above-mentioned conditions, a recording portion of the medium is heated by a laser beam, and an external magnetic field is applied. The polarity of the external magnetic field is a direction opposite to the direction of magnetization of the initializing layer for a P-type medium, and is the same direction as the direction of magnetization of the initializing layer for an A-type medium.

At this time, the direction of magnetization of the recording layer aligns in the direction of the external magnetic field, thus achieving the type 1 recording.

In this case, although an interface magnetic wall is generated between the initializing layer and the recording layer, the magnetization of the initializing layer does not influence the recording layer at room temperature, and hence, the recorded information is held.

Figure 2A:
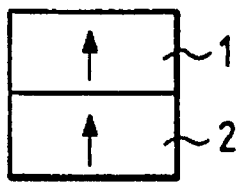
FIG. 2(a) and (b) are views illustrating magnetization states upon execution of recording based on an information recording method of the instant invention.
Figure 2B:
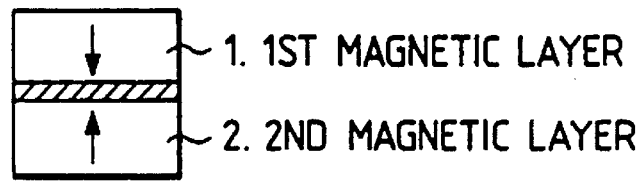

When the type 2 recording (recording of the other one of two values different from that recorded by the type 1 recording) is performed, the external magnetic field is turned off, and only a laser beam is radiated. At this time, the direction of magnetization of the recording layer follows in a stable direction with respect to the magnetization of the initializing layer due to the exchange coupling force from the initializing layer, thus achieving the type 2 recording (see FIGS. 2(a) and (b).

Since the recording layer of a portion which is not irradiated with the laser beam has a sufficiently large coercive force, the direction of magnetization of the recording layer of this portion is not reversed upon reception of the exchange coupling force from the initializing layer. For this reason, new information can be over-written only on the portion irradiated with the laser beam.

The external magnetic field need not be focused to a size as small as the portion irradiated with the beam (spot region), and the region applied with the external magnetic field can be considerably larger than the spot region.

When the external magnetic field is turned on/off in correspondence with digital data "1" or "0" while radiating the laser beam, new information can be over-written on old information (see FIGS. 3(a)–(c).

Realization of High-speed Data Transfer

In this method, since the over-write recording is attained by turning on/off the external magnetic field, the magnetic field need not be reversed in the recording state, as shown in FIG. 3(c). Note that FIGS. 3(a)–(c) exemplify a case of pit position recording. Similarly, the instant invention can be applied to other recording methods such as pit edge recording. In contrast to this, in a conventional magnetic field modulation over-write recording method, recording is attained by reversing the direction of magnetization from "+" to "−" or vice versa as shown in FIG 3(b).

Figure 4A:
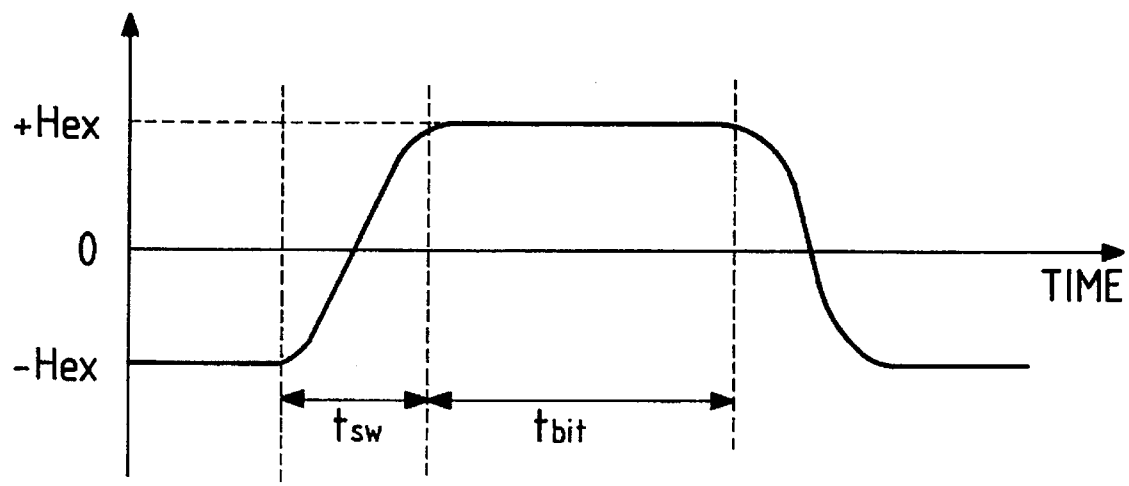
FIG. 4A is a graph showing a change in magnetic field of a conventional external magnetic field.

In this case, as shown in FIG. 4A, since a predetermined time ($t_{sw}$) is required for reversing a leakage magnetic field from a magnetic head, and a sufficient magnetic field cannot be applied within this time, an unstable magnetic domain is formed. When the ratio of $t_{sw}$ to a time ($t_{bit}$) required for forming one reversed magnetic domain increases, an accurate reproduced signal cannot be obtained, resulting in an error.

A high transfer speed can be achieved by increasing the rotational speed of the medium and the recording frequency without changing the size of one bit. In this case, however, since $t_{sw}$ remains the same, the above-mentioned problem becomes more serious if the transfer speed is increased.

Figure 4B:
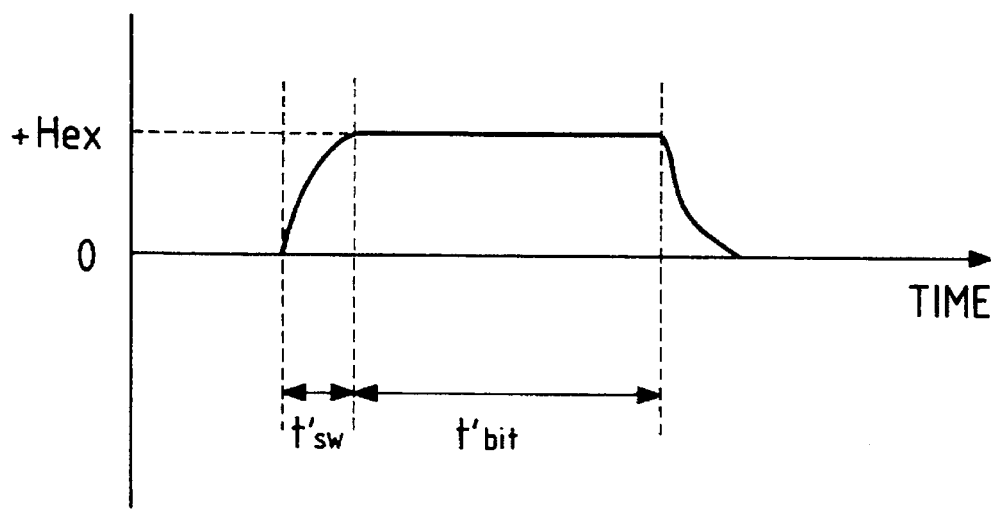
FIG. 4B is a graph showing a change in magnetic field of an external magnetic field of the instant invention.

In contrast to this, in the recording method of the instant invention, since the over-write recording is attained by turning on/off a magnetic field without reversing the direction of the magnetic field, $t_{sw}$ is shortened as compared to the conventional method, as shown in FIG. 4B. For this reason, even when the transfer speed is increased, a magnetic domain is accurately recorded, and a reproduced signal does not deteriorate.

More specifically, high-speed data transfer can be realized.

TEST EXAMPLES

The instant invention will be described in more detail hereinafter by way of its test examples. However, the instant invention is not limited to the following test examples if changes to be made fall within the scope of the invention.

TEST EXAMPLE 1

Figure 5A:
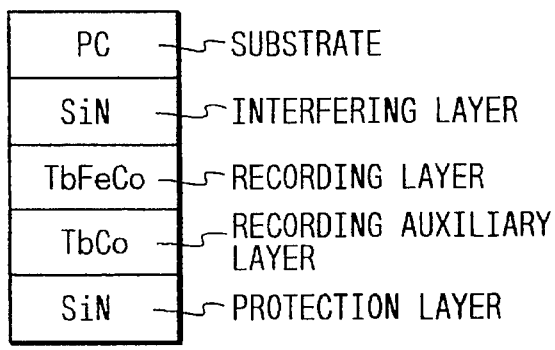
FIG. 5A is a view showing, as an example of the magneto-optical recording medium of the instant invention, a structure obtained by adding an interfering layer and a protection layer to the basic structure shown in FIG. 1.

After a 1,000-Å thick SiN layer was formed on a polycarbonate (PC) substrate having pre-grooves (a diameter of 130 mm) using a magnetron sputtering apparatus so as to obtain anti-oxidation and interfering effects, an 800-Å thick TbFeCo layer serving as a recording layer and a 1,500-Å thick TbCo layer serving as an initializing layer were formed. Thereafter, in order to enhance the anti-oxidation and interfering effects, a 300-Å thick SiN layer was continuously formed without breaking the vacuum state, thus manufacturing a magneto-optical recording medium of the instant invention having the layer structure shown in FIG. 5A.

A bit was recorded on the magneto-optical recording medium to have a minimum mark length of 0.8 μm while increasing the recording frequency as the linear velocity was increased (e.g., recording at a frequency of 3.13 MHz at a linear velocity of, e.g., 5 m/s).

The recording power was set to be a value which maximized the C/N ratio. The laser wavelength was set to be 780 nm.

Figure 6:
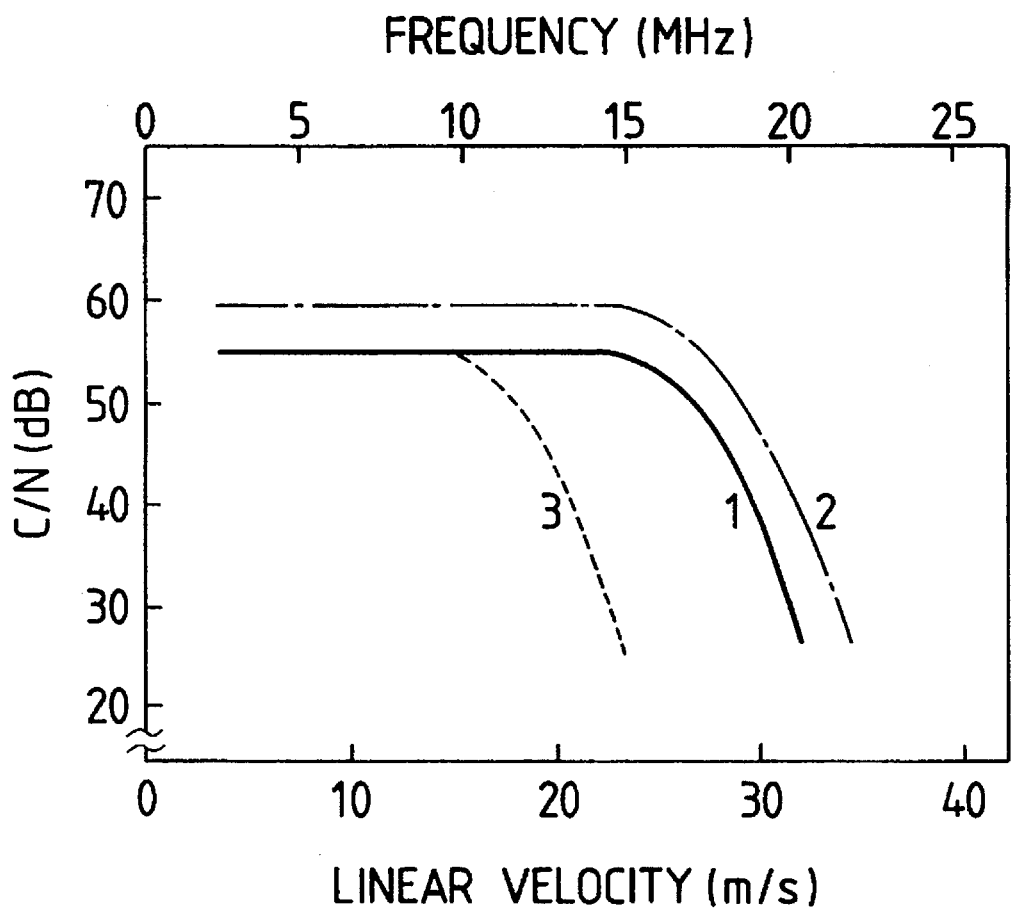
FIG. 6 is a graph showing the linear velocity dependency of the C/N ratio of the magneto-optical recording medium of the instant invention, and the conventional magneto-optical recording medium.

Solid curve 1 in FIG. 6 represents the C/N ratio measured after recording, and the linear velocity and recording frequency in the recording state. The C/N ratio did not deteriorate up to a linear velocity of 28.5 m/s and a recording frequency of 17.8 MHz (a C/N ratio of 45 dB or less).

Magneto-optical recording media of Test Examples 2 to 11 were manufactured by changing the film thicknesses, materials, and compositions of magnetic layers while the layer structure remained the same, and the same measurement was performed. Table 1 shows the film thicknesses, materials, and compositions of the magnetic layers of Test Examples 2 to 11. Table 4 shows the measurement results.

Test Example 12

Figure 5B:
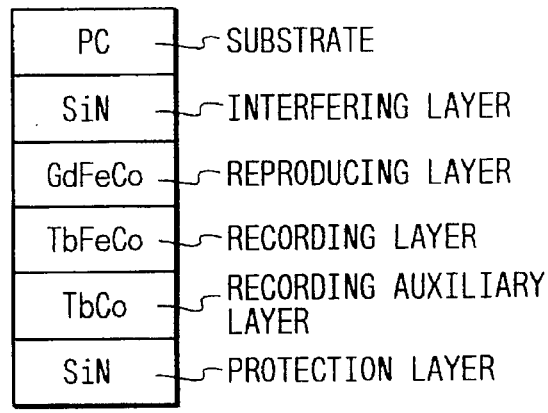
FIG. 5B is a view showing a structure obtained by further adding a reproducing layer on the recording layer.

After a 1,000-Å thick SiN layer was formed on a polycarbonate (PC) substrate having pre-grooves (a diameter of 130 mm) using a magnetron sputtering apparatus so as to obtain anti-oxidation and interfering effects, a 300-Å thick GbFeCo layer serving as a reproducing layer, a 300-Å thick TbFeCo layer serving as a recording layer, and a 400-Å thick TbCo layer serving as an initializing layer were formed. Thereafter, in order to enhance the anti-oxidation and interfering effects, a 300-Å thick SiN layer was continuously formed without breaking the vacuum state, thus manufacturing a magneto-optical recording medium of the instant invention having the layer structure shown in FIG. 5B.

A bit was recorded on the magneto-optical recording medium to have a minimum mark length of 0.8 μm while increasing the recording frequency as the linear velocity increased.

The recording power was set to be a value which maximized the C/N ratio. The laser wavelength was set to be 780 nm.

Alternate long and short dashed curve 2 in FIG. 6 represents the C/N ratio measured after recording, and the linear velocity and recording frequency in the recording state. The C/N ratio did not deteriorate up to a linear velocity of 31.2 m/s and a recording frequency of 19.5 MHz (a C/N ratio of 45 dB or less). Table 2 shows the compositions of this magneto-optical recording medium.

Test Example 13

Figure 5C:
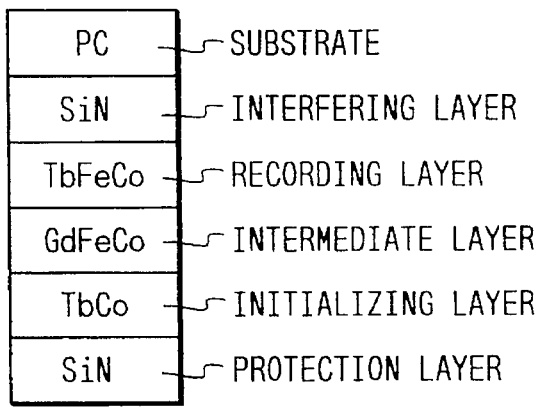
FIG. 5C is a view showing a structure obtained by further adding an intermediate layer between the recording layer and the initializing layer.

After a 1,000-Å thick SiN layer was formed on a polycarbonate (PC) substrate having pre-grooves (a diameter of 130 mm) using a magnetron sputtering apparatus so as to obtain anti-oxidation and interfering effects, an 800-Å thick TbFeCo layer serving as a recording layer, a 50-Å thick GdFeCo layer serving as an intermediate layer for adjusting magnetic wall energy, and an 800-Å thick TbCo layer serving as an initializing layer were formed. Thereafter, in order to enhance the anti-oxidation and interfering effects, a 300-Å thick SiN layer was continuously formed without breaking the vacuum state, thus manufacturing a magneto-optical recording medium of the instant invention having the layer structure shown in FIG. 5C.

A bit was recorded on the magneto-optical recording medium to have a minimum mark length of 0.8 μm while increasing the recording frequency as the linear velocity increased.

The recording power was set to be a value which maximized the C/N ratio. The laser wavelength was set to be 780 nm.

Alternate long and short dashed curve 2 in FIG. 6 represents the C/N ratio measured after recording, and the linear velocity and recording frequency in the recording state. The C/N ratio did not deteriorate up to a linear velocity of 31.2 m/s and a recording frequency of 19.5 MHz (a C/N ratio of 55 dB or less).

A magneto-optical recording medium of Test Example 14 was manufactured by changing the film thicknesses, materials, and compositions of magnetic layers while the layer structure remained the same, and the same measurement was performed. Table 3 shows the film thicknesses, materials, and compositions of the magnetic layers of Test Example 14. Table 4 shows the measurement results.

Comparative Test Example 1

A magneto-optical recording medium having substantially the same structure as that of Test Example 1 was manufactured, except that an Al reflection layer was formed in place of the TbCo initializing layer.

A bit was recorded on the magneto-optical recording medium to have a minimum mark length of 0.8 μm while increasing the recording frequency as the linear velocity increased.

The recording power was set to be a value which maximized the C/N ratio. The laser wavelength was set to be 780 nm.

Broken curve 3 in Fig. 6 represents the C/N ratio measured after recording, and the linear velocity and recording frequency in the recording state. The C/N ratio deteriorated at a linear velocity of 19.8 m/s and a recording frequency of 12.4 MHz (a C/N ratio of 45 dB or less).

A magneto-optical recording medium of Comparative Test Example 2 was manufactured by changing the film thicknesses, materials, and compositions of magnetic layers while the layer structure remained the same, and the same measurement was performed. Table 1 shows the film thicknesses, materials, and compositions of the magnetic layers of Comparative Test Example 2. Table 4 shows the measurement results.

TABLE 1

|  | First Magnetic Layer | | Second Magnetic Layer | |
|---|---|---|---|---|
|  | Composition (at %) | Film Thickness (Å) | Composition (at %) | Film Thickness (Å) |
| Test Example 1 | $Tb_{21}Fe_{72}Co_7$ | 800 | $Tb_{30}Co_{70}$ | 1,500 |
| Test Example 2 | $Tb_{21}Fe_{72}Co_7$ | 500 | $Tb_{30}Co_{70}$ | 1,500 |
| Test Example 3 | $Tb_{21}Fe_{72}Co_7$ | 400 | $Tb_{30}Co_{70}$ | 1,500 |
| Test Example 4 | $Tb_{21}Fe_{72}Co_7$ | 800 | $Tb_{30}Co_{70}$ | 1,000 |
| Test Example 5 | $Tb_{21}Fe_{72}Co_7$ | 800 | $Tb_{30}Co_{70}$ | 800 |
| Test Example 6 | $Tb_{21}Fe_{72}Co_7$ | 800 | $Tb_{30}Co_{70}$ | 400 |
| Test Example 7 | $Dy_{20}Fe_{72}Co_8$ | 800 | $Tb_{30}Co_{70}$ | 1,000 |
| Test Example 8 | $Tb_{21}Fe_{72}Co_7$ | 800 | $Gd_{15}Tb_{14}Co_{71}$ | 1,500 |
| Test Example 9 | $Tb_{19}Fe_{74}Co_7$ | 800 | $Tb_{30}Co_{70}$ | 800 |
| Test Example 10 | $Tb_{22}Fe_{71}Co_7$ | 300 | $Tb_{30}Co_{70}$ | 400 |
| Test Example 11 | $Tb_{21}Fe_{64}Co_{15}$ | 600 | $Gd_{15}Tb_{14}Co_{71}$ | 600 |
| Comparative Test Example 1 | $Tb_{21}Fe_{72}Co_7$ | 800 | Al | 500 |
| Comparative Test Example 2 | $Tb_{23}Fe_{70}Co_7$ | 700 | Al | 400 |

TABLE 2

|  | Reproducing Layer | | First Magnetic Layer | | Second Magnetic Layer | |
|---|---|---|---|---|---|---|
|  | Composition (at %) | Film Thickness | Composition (at %) | Film Thickness | Composition (at %) | Film Thickness |
| Test Example 12 | $Gd_{20}Fe_{65}Co_{15}$ | 300 | $Tb_{21}Fe_{72}Co_7$ | 300 | $Tb_{30}Co_{70}$ | 400 |

TABLE 3

|  | First Magnetic Layer | | Intermediate Layer | | Second Magnetic Layer | |
|---|---|---|---|---|---|---|
|  | Composition (at %) | Film Thickness | Composition (at %) | Film Thickness | Composition (at %) | Film Thickness |
| Test Example 13 | $Tb_{21}Fe_{72}Co_7$ | 800 | $Gd_{40}Fe_{40}Co_{20}$ | 50 | $Tb_{30}Co_{70}$ | 800 |
| Test Example 14 | $Tb_{21}Fe_{72}Co_7$ | 500 | $Gd_{34}Fe_{42}Co_{24}$ | 40 | $Tb_{30}Co_{70}$ | 500 |

TABLE 4

| Measurement Results | | |
|---|---|---|
|  | Recording Frequency (MHz) | Linear Velocity (m/s) |
| Test Example 1 | 17.8 | 28.5 |
| Test Example 2 | 16.0 | 25.6 |
| Test Example 3 | 14.0 | 22.4 |
| Test Example 4 | 17.2 | 27.5 |
| Test Example 5 | 17.0 | 27.2 |
| Test Example 6 | 16.5 | 26.4 |
| Test Example 7 | 17.3 | 27.7 |
| Test Example 8 | 16.4 | 26.2 |
| Test Example 9 | 15.9 | 25.4 |
| Test Example 10 | 16.2 | 25.9 |
| Test Example 11 | 15.8 | 25.3 |
| Test Example 12 | 19.8 | 31.7 |
| Test Example 13 | 19.0 | 30.4 |
| Test Example 14 | 18.1 | 29.0 |
| Comparative Test Example 1 | 12.4 | 19.8 |
| Comparative Test Example 2 | 11.0 | 17.6 | minimum bit length = 0.8 μm

What is claimed is:

1. An information recording method for recording information on a magneto-optical recording medium that includes a first magnetic layer having a perpendicular magnetic anisotropy, and a second magnetic layer having a perpendicular magnetic anisotropy and in which a direction of magnetization remains constantly aligned in one direction at all times, said method comprising the steps of:

radiating a laser beam, which is not modulated in accordance with the information to be recorded, onto the recording medium; and while the laser beam is being irradiated onto the recording medium, selectively performing, in accordance with the information to be recorded, one of (i) a first type of recording step of applying an external magnetic field to align a direction of magnetization of the first magnetic layer in a direction of the external magnetic field, and (ii) a second type of recording step of removing the external magnetic field, the laser beam irradiation being effective to align the direction of magnetization of the first magnetic layer in a direction that is stable with respect to the direction of magnetization of the second magnetic layer.

2. A method according to claim 1, wherein the selection is achieved by turning on/off the external magnetic field in accordance with the information.

3. A magneto-optical recording medium comprising:

a first magnetic layer having a perpendicular magnetic anisotropy; and a second magnetic layer having a perpendicular magnetic anisotropy, and exchange-coupled to said first magnetic layer, wherein said first and second magnetic layers are formed sequentially beginning at a side of said recording medium at which a laser beam is incident during a recording operation, and satisfy the following conditions:

$Tc_1 < Tc_2$, $Hc_1 < Hc_2$, and $Hex > (Hc_1 + Hw_1)$ and $Hc_1 < Hw_1$ in a laser radiated state, and $Hex < (Hc_1 + Hw_1)$ and $Hc_1 > Hw_1$ in a laser non-radiated state, always, $$Hex < \frac{2Ms_1h_1Hc_1 + 2Ms_2h_2Hc_2}{2Ms_1h_1 + 2Ms_2h_2}$$

and $Hex < Hc_2 - Hw_2$ and $Hc_2 > Hw_2$ where $Ms_1$ is the saturation magnetization of said first magnetic layer, $Hc_1$ is the coercive force of said first magnetic layer, $Ms_2$ is the saturation magnetization of said second magnetic layer, $Hc_2$ is the coercive force of said second magnetic layer, $h_1$ is the film thickness of said first magnetic layer, $Tc_1$ is the Curie temperature of said first magnetic layer, $h_2$ is the film thickness of said second magnetic layer, $Tc_2$ is the Curie temperature of said second magnetic layer, $Hw_1$ is the exchange force applied by said second magnetic layer to said first magnetic layer, $Hw_2$ is the exchange force applied by said first magnetic layer to said second magnetic layer, and Hex is an external magnetic field.

4. A medium according to claim 3, wherein each of said first and second magnetic layers consists of a rare earth-transition metal amorphous alloy.

* * * * *

UNITED STATES PATENT AND TRADEMARK OFFICE
CERTIFICATE OF CORRECTION

PATENT NO. : 5,587,974                Page 1 of 2
DATED      : December 24, 1996
INVENTOR(S): NAOKI NISHIMURA It is certified that error appears in the above-indentified patent and that said Letters Patent is hereby corrected as shown below:

ON THE COVER PAGE:

[57] ABSTRACT:

Line 14, "lazer" should read --laser--.

Line 15, "magnetooptical" should read --magneto-optical--.

COLUMN 5:

Line 29, "a→xstate 1 A" should read --a→x state 1. A--.

UNITED STATES PATENT AND TRADEMARK OFFICE
CERTIFICATE OF CORRECTION

PATENT NO. : 5,587,974  Page 2 of 2
DATED : December 24, 1996
INVENTOR(S) : NAOKI NISHIMURA It is certified that error appears in the above-indentified patent and that said Letters Patent is hereby corrected as shown below:

<u>COLUMN 5</u>:

Line 35, "b→x state 1 A" should read --b→x state 1. A--.

Line 58, "b→x state 1 A" should read --b→x state 1. A--.

Signed and Sealed this

Twenty-fourth Day of June, 1997

*Attest:*

BRUCE LEHMAN

*Attesting Officer*   Commissioner of Patents and Trademarks